Sept. 16, 1958  O. M. KENDON  2,852,656
HOUSEHOLD WATER HEATING APPARATUS

Filed May 28, 1957  4 Sheets-Sheet 1

INVENTOR
OWEN MURRAY KENDON

BY
Watson, Cole, Grindle + Watson
ATTORNEYS

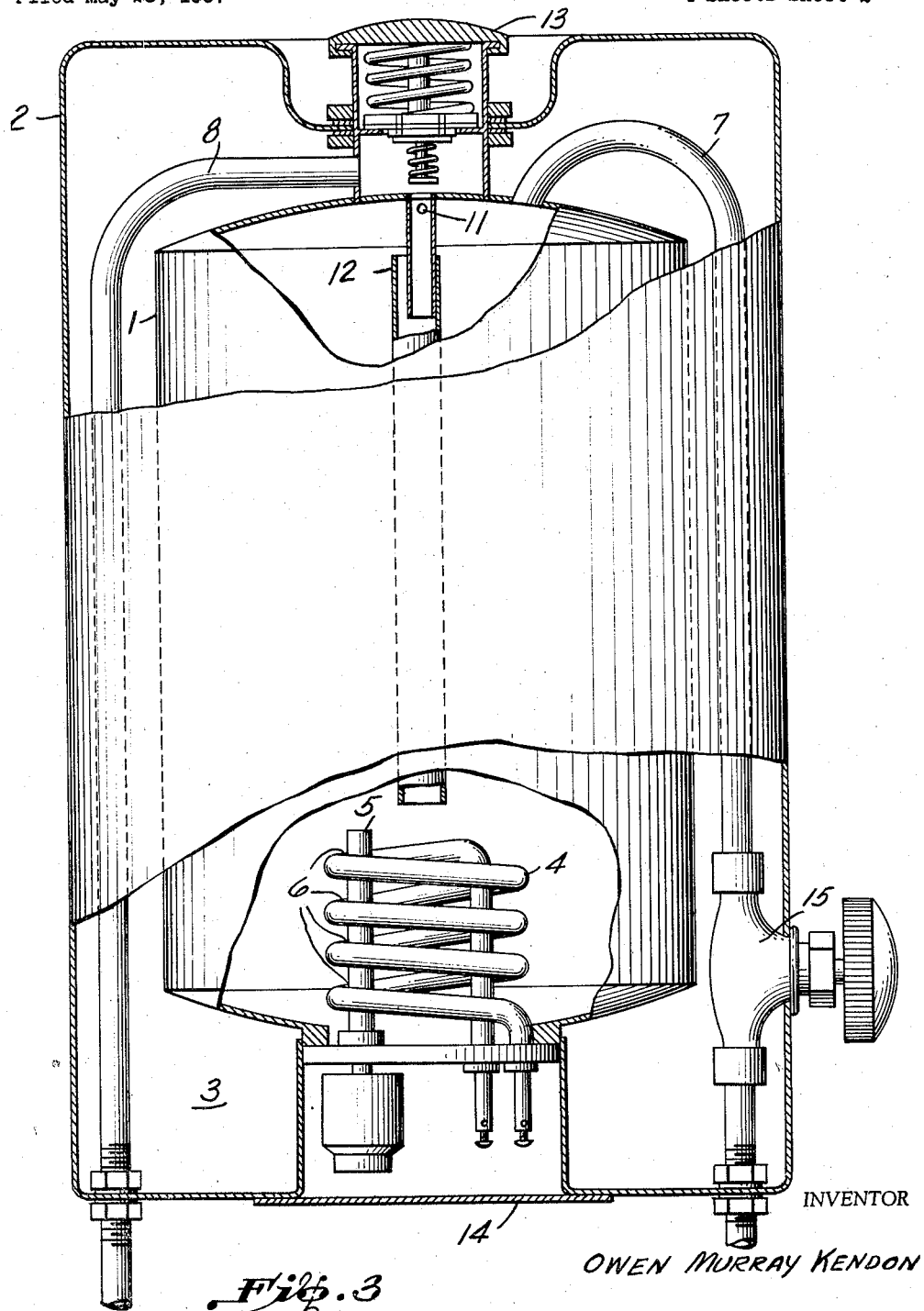

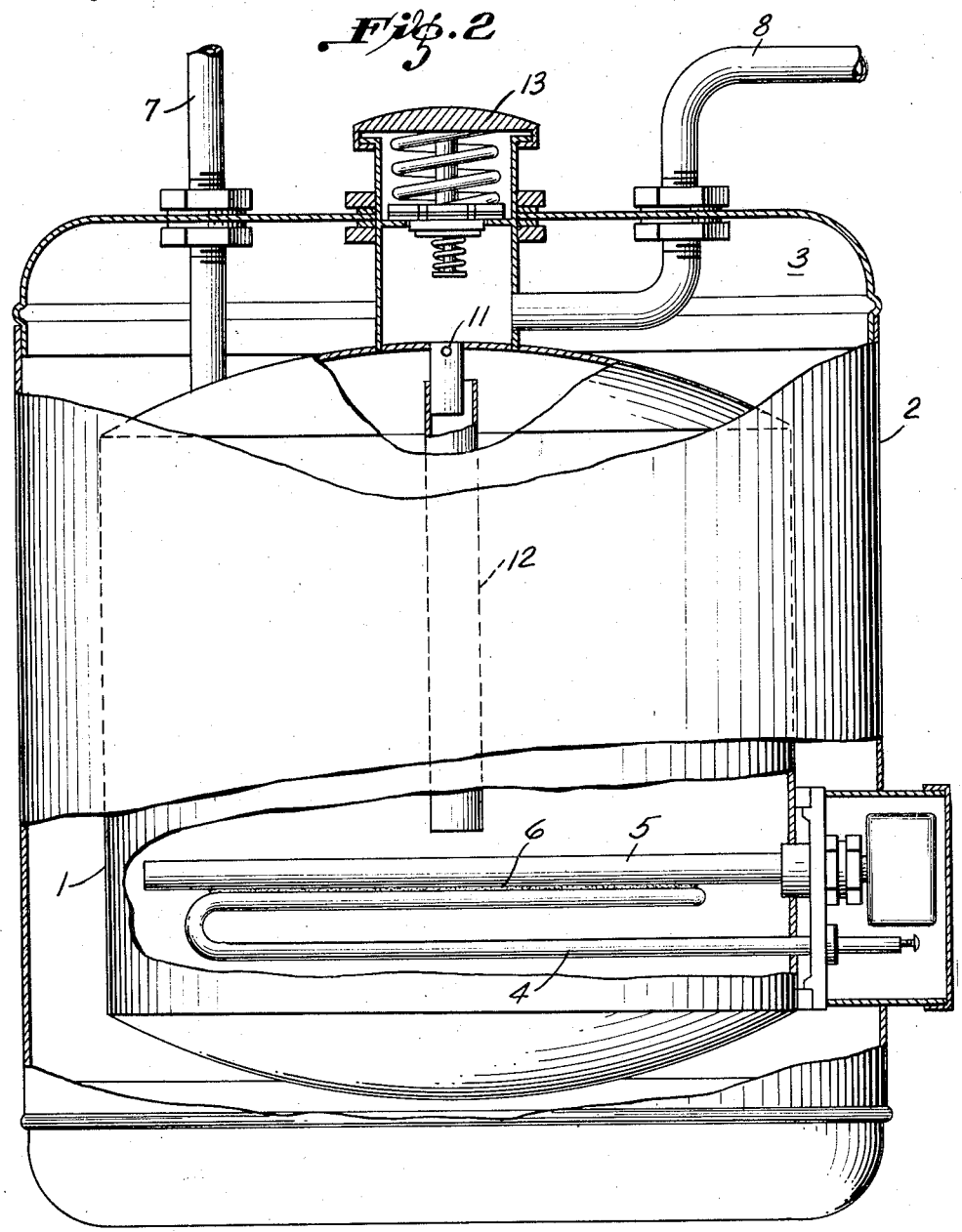

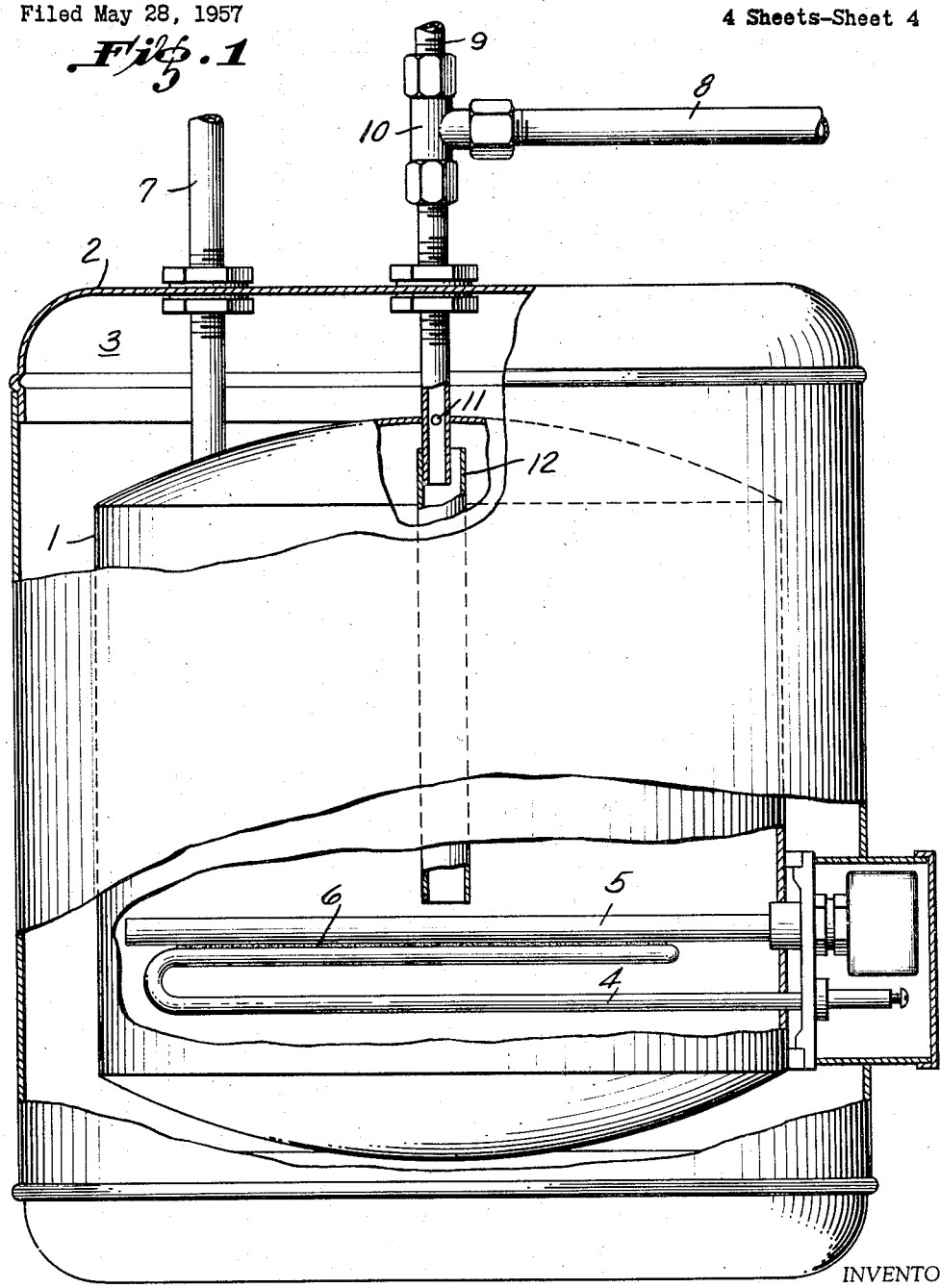

United States Patent Office 2,852,656
Patented Sept. 16, 1958

2,852,656

HOUSEHOLD WATER HEATING APPARATUS

Owen Murray Kendon, Auckland, Auckland, New Zealand, assignor to Kendon Developments Limited, Auckland, Auckland, New Zealand Application May 28, 1957, Serial No. 662,287

Claims priority, application New Zealand June 19, 1956

15 Claims. (Cl. 219—38)

This invention relates to water heating apparatus of the type comprising a container adapted to receive and to hold a volume of water at a pressure greater than atmospheric pressure, means adapted to retain said pressure, inlet means adapted to supply water into the container, water heating means associated with the container, and adapted to raise substantially the whole of the volume of water to a temperature above 212° F., thermostatic control means adapted to so control the water heating means as to prevent the volume of water from reaching the temperature at which it boils under the maximum pressure to which it is subjected, and controllable outlet means through which water may be discharged from the container.

It is an object of the present invention to provide a water heater of the type described which is simple to operate, and to manufacture, and which is effective in use.

A further object of the invention consists in water heating and hot water supplying apparatus of the type described wherein said inlet means comprises a pipe entering the container and passing downwardly through the container to near the top of the said water heating means, wherein excess pressure relieving means is associated with said pipe inside the container towards the upper end thereof, and wherein at least a part of the thermostatic control means and the heating means are connected to each other by thermally conducting material so that heat will be conducted to said thermostatic control means even in the absence of water.

In order that the invention may be fully understood, it will now be further described with reference to the examples illustrated in the accompanying drawings in which:

Fig. 1 is a side elevation partly in section showing apparatus in accordance with the invention having pressure retaining means in the form of an expansion pipe;

Fig. 2 is a side elevation partly in section showing similar apparatus having an alternative form of pressure retaining means;

Fig. 3 is a side elevation partly in section of a modification of the apparatus illustrated in Fig. 2.

The same numbers are used to indicate the same or similar parts throughout the drawings.

Figure 4:
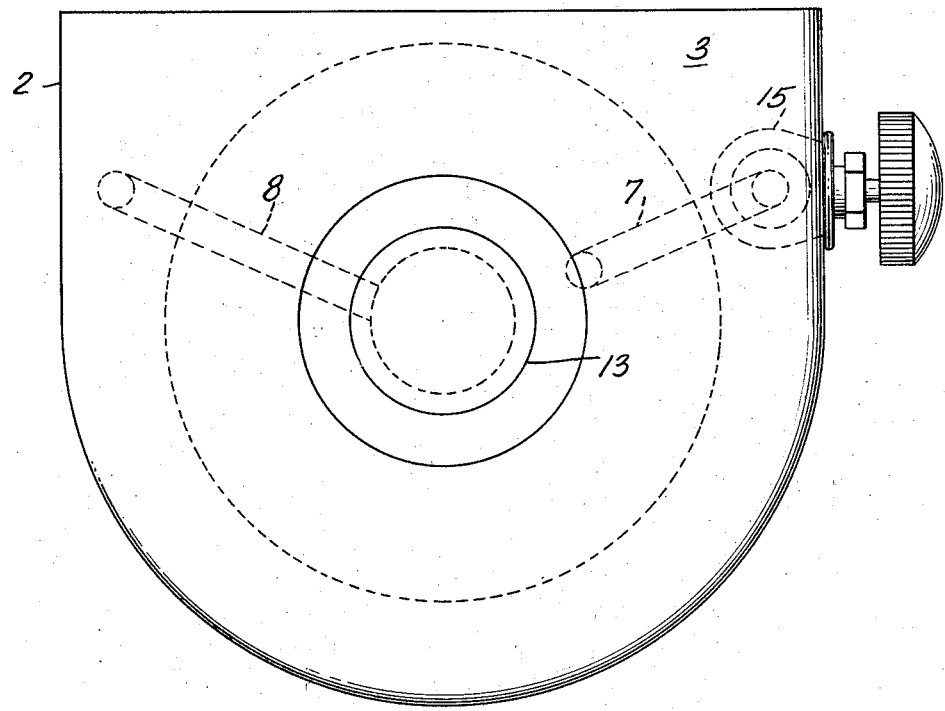
Fig. 4 is a top plan view of Fig. 3.

Fig. 1 shows a domed cylindrical container 1 which is of a size and construction satisfactory to hold the desired volume of water and to resist the pressures to which it is likely to be subjected. The container 1 is mounted in a sheet-metal or other box 2 and is surrounded by a space 3 containing suitable insulating material.

An aperture is provided in one of the walls of the container 1, towards the lower end thereof, to receive heating means in the form of an electric immersion element 4 of known type and thermostatic control means are provided in the form of a thermostatic switch mounted in a pocket 5 and adapted to control the element 4 so as to prevent the water in the container from reaching the temperature at which it boils under the pressure to which it is subjected. Such thermostatic switches are, of course, well known. The thermostat pocket 5 and the element 4 are attached to each other by means of brazing 6 so that heat will be conducted from the element 4 to the thermostat 5 whether or not the combination is immersed in water. As an alternative to brazing, any other known method of attachment may be used which is such that it provides a substantial path having good properties of thermal conduction. The attachment of the element 4 to the thermostat pocket 5 is an important feature since it ensures that even if, through some failure, the water in the container 1 falls below the level of the element 4, this will still be switched off before serious overheating can occur.

In the upper surface of the container 1, a controllable outlet means is provided, comprising a pipe 7 connecting the container to a suitable tap or cock. Also disposed so as to enter the container 1 through the top thereof is a water inlet pipe 8 combined with pressure retaining means constructed as follows. A length of pipe 9 which opens into the container 1 is continued to a convenient height above the container 1, for example, sixteen feet, and thus forms an expansion or vent pipe which retains the pressure hydrostatically.

The pipe 9 is open to atmosphere at its upper end and projects a short distance into the container 1 at its lower end which distance may, for example, be one and a quarter inches.

The water inlet pipe 8 is joined to the expansion pipe 9 by means of a T connection 10, the pipe 8 being connected to a source of constant pressure water, for example, a header tank having its water level maintained substantially constant, or, alternatively, a pressure control valve of any suitable known type.

The pipe 9 is provided with air bleeding means of the kind described in U. S. Patent No. 2,786,126, issued March 19, 1957, comprising a small aperture 11 having a cross sectional area of between .0002 and .003 of a square inch, when a heating element of 2000 watt rating is used or a proportionally different area for other sizes of heating element. The top of the container 1 is dome-shaped, and the aperture 11 is positioned so as to be as high up within the dome as is conveniently possible.

The pipe 9 has a continuation 12 attached to its lower end, Fig. 1, the continuation 12 leading to just above the thermostat pocket 5. The continuation 12 comprises a length of pipe of a larger diameter than that of the pipe 9. The pipe 12 is overlapped over the pipe 9, so that the pipe 12 extends to within about a quarter of an inch below the air bleed hole 11 mentioned above. The pipe 12 is suitably welded or otherwise fastened to the pipe 9 in a manner such that an aperture is left between the outer wall of the pipe 9 and the inner wall of the pipe 12.

The pipe 9 may conveniently comprise half-inch water pipe while the pipe 12 is of three-quarter inch pipe. As an equivalent alternative to this arrangement, the pipe 9 may continue downwardly to just above the thermostat pocket 5 and may have a branch pipe opening into it a short distance below the level of the hole 11. The branch pipe is disposed at an acute angle to the pipe 9 and is directed towards the top of the container 1. The open end of the branch pipe is disposed a short distance, a quarter of an inch, for example, below the top of the container 1.

Both the two arrangements mentioned above constitute excess pressure relieving means and are so constructed that during normal operations no substantial amount of fresh cool water mixes with the water already present at the top of the container.

The use of the above constructions is as follows: If hot water is drawn off through the pipe 7, fresh cool water will enter the container 1 to replace this water. However, the cool supply of water enternig the air vent pipe 9 through the T 10 passes downwardly to near the bottom of the container 1 through the continuation pipe 12 of pipe 9 and there is little or no mixing of the fresh cool water with the remainder of the water in the container quickly enough to cool it below its desired temperature until a large proportion of the heated water has been drawn off. For example, in a household size which is considered to be satisfactory at about three gallons, up to two gallons may be drawn off before the delivery temperature has dropped below the atmospheric boiling point. Any air freed from the water due to its heating, will pass through the bleed hole 11 into the air vent pipe 9 and thus rise through this pipe to the atmosphere. The provision of the aperture between the pipe 9 and the pipe 12, or of the branch pipe as above described is to provide excess steam pressure relieving means which operate as follows. If the thermostat fails to switch off at the required temperature, steam pressure will build up to a pressure greater than that retained by the expansion or air vent, at which greater pressure water will be ejected from the air vent pipe 9. The water level in the container will then drop approximately an inch and a quarter until steam is able to escape up the air vent pipe 9 so that the pressure will drop. When the pressure has dropped to below the pressure of the supply, fresh cool water will enter the container, but the proportion of cool supply water to that of the remaining high temperature water, will not normally be sufficient to cool it below the atmospheric boiling point. This action will continue until the element is switched off, thus relieving the excess pressure. In the event of the supply being cut off under these conditions, there is little likelihood that the container will be collapsed by atmospheric pressure due to the generation of a vacuum within the container when the supply returns, since air may readily enter the container through the extra aperture near the top thereof. The vertical height between the level of the air-bleed hole 11 which is, effectively almost the highest level which can be reached by water within the container, and that of the lower end of the pipe 9 is preferably such as to provide a volume of water sufficient to fill the whole of the length of the pipe 9 to the desired height. This is desirable in order that steam shall not be able to escape into the pipe 9 except under abnormal conditions. It has been found that the passage of cool water past the air-bleed hole 11 is sufficient to prevent evaporation being caused by the wall of the pipe 9 adjacent the hole 11 during the temporary reduction in pressure which occurs when the delivery of hot water takes place. This results in the important advantage that solid deposition or scaling is substantially eliminated at this point and thus ensures that the hole 11 does not become blocked. A further advantage of connecting the inlet pipe 8 to the pipe 9 is that if the pipe 9 should become so hot that boiling takes place therein, the resultant reduction of pressure will cause fresh cool water to enter the pipe 9 and thus cool it sufficiently to stop the boiling.

Figure 2 shows a similar apparatus wherein the vent pipe 9 is replaced by pressure retaining means in the form of a valve 13. The valve 13 is a pressure relief valve with air inlet means. It is so arranged that it will open to let fluid escape from the container 1 before the pressure in the container reaches a dangerous level. The valve 13 will also open to let air into the container 1 if the pressure therein should fall below a small amount, for example, half a pound per square inch, less than atmospheric pressure, in order to avoid the danger of collapse in the event of a vacuum occurring in the container 1.

In this case the hole 11 may be larger than that described in connection with Figure 1 and may, for example, be an eighth of an inch hole. One purpose of the hole 11 is to provide an air-bleed to atmosphere for use when the container is being filled from an empty condition. At such times the valve 13 may be removed from its seat so that the container 1 is open to the atmosphere. In operation, the main purpose of the air bleed hole 11 is to allow a quantity of the gases released from the water to collect below the valve 13 thus tending to ensure that when the valve 13 opens to relieve pressure caused by expansion in the container 1, the said gases will be ejected rather than water. Gases may also be carried out through the outlet pipe 7 during deliveries therefrom. It will be understood that any other suitable known valve or combination of valves may be used in place of the valve 13.

The inlet pipe 8 is again brought into the container 1 at a point which ensures that fresh cool water keeps the area, including the valve 13 and the hole 11, cool at times when "scaling" is likely to occur.

Figures 3 and 4 show a modification of the apparatus shown in Figure 2. In this case the box 2 is shaped in such a way that it may be fastened to a wall, both the inlet pipe 8 and the outlet pipe 7 entering the box 2 through the bottom thereof. Apparatus of this kind may be mounted above a kitchen sink for example. The thermostat pocket 5 and the heating element 4 are arranged at the bottom of the apparatus and are covered by a removable plate 14. A cock 15 is shown incorporated in the apparatus but may, if desired, be situated at some remote point in the outlet pipe 7.

It is of course obvious that means other than electrical heating can be incorporated, in which case the element 4 would be replaced by a heat transfer element, which latter would be heated by gas or liquid fuel flame. Such heat transfer element can be readily incorporated in the bottom structure of the container 1. Also in this case the heat transfer element is in contact with the thermostatic control means 5 by, for example, the brazing connection 6.

What is claimed is:

1. Water heating and hot water supplying apparatus comprising a container, heating means in said container, inlet means comprising a pipe entering the container and passing downwardly through the container to near the top of said water heating means, excess pressure relieving means associated with said pipe inside the container towards the upper end thereof, and comprising an aperture in the inlet pipe formed between the end of the inlet pipe and a continuation thereof, said continuation having a larger diameter than that of the inlet pipe, thermostatic control means, and at least a part of the thermostatic control means and the heating means being connected to each other by thermally conducting material so that heat will be conducted to said thermostatic control means even in the absence of water.

2. Water heating and hot water supplying apparatus according to claim 1, in which the inlet pipe enters the container at the top thereof.

3. Water heating and hot water supplying apparatus according to claim 1, in which the continuation overlaps the end of the inlet pipe.

4. Water heating and hot water supplying apparatus according to claim 1, in which the continuation is welded to the inlet pipe.

5. Water heating and hot water supplying apparatus according to claim 1, in which the excess pressure relieving means comprises a branch pipe extending from the inlet pipe and opening at a point a short distance below the top of the container.

6. Water heating and hot water supplying apparatus according to claim 1, in which air bleeding means is provided in association with said inlet pipe within the container.

7. Water heating and hot water supplying apparatus according to claim 1, in which air bleeding means is provided in association with said inlet pipe within the container, the air bleeding means comprising a small hole in said inlet pipe in close proximity to the top of the container.

8. Water heating and hot water supplying apparatus according to claim 1, in which pressure retaining means is provided comprising a vent pipe connecting the interior of the container to the atmosphere, said vent pipe opening at a height above the container to enable the desired maximum pressure to be hydrostatically maintained therein.

9. Water heating and hot water supplying apparatus according to claim 1, in which pressure retaining means is provided comprising a vent pipe connecting the interior of the container to the atmosphere, said vent pipe opening at a height above the container to enable the desired maximum pressure to be hydrostatically maintained therein, the inlet pipe being connected to the vent pipe, so that the branch of the connection which leads to the container serves both as an inlet pipe and as a vent pipe.

10. Water heating and hot water supplying apparatus according to claim 1, in which the pressure retaining means comprises a pressure relief valve with air inlet means.

11. Water heating and hot water supply apparatus according to claim 1, in which the pressure retaining means comprises a pressure relief valve with air inlet means, the valve being adapted to release fluid from within the container when the pressure therein becomes too great and to allow air to enter the container if the pressure therein drops more than a small amount below atmospheric pressure.

12. Water heating and hot water supplying apparatus according to claim 1, in which the pressure retaining means comprises a pressure relief valve with air inlet means, the valve being inoperative by removing it from its seat.

13. Water heating and hot water supplying apparatus according to claim 1, in which the heating means and the thermostatic control means are brazed to one another.

14. Water heating and hot water supplying apparatus according to claim 1, in which the heating means is in the form of an electrical heating element.

15. Water heating and hot water supplying apparatus according to claim 1, in which the thermostatic control means is in the form of a pocket containing an electrical thermostatic switch.

References Cited in the file of this patent
UNITED STATES PATENTS

| | | |
|---|---|---|
| 1,430,706 | Wallmann | Oct. 3, 1922 |
| 1,450,833 | Bergeon | Apr. 3, 1923 |
| 1,560,528 | Baum | Nov. 10, 1925 |
| 1,727,881 | Hoyt | Sept. 10, 1929 |
| 1,930,551 | Blashfield | Oct. 17, 1933 |
| 2,066,190 | Swars | Dec. 29, 1936 |
| 2,785,272 | Baly | Mar. 12, 1957 |
| 2,786,126 | Kendon | Mar. 19, 1957 |